(12) United States Patent
Parker et al.

(10) Patent No.: US 7,817,633 B1
(45) Date of Patent: Oct. 19, 2010

(54) METHOD OF PROVIDING VIRTUAL ROUTER FUNCTIONALITY THROUGH ABSTRACTED VIRTUAL IDENTIFIERS

(75) Inventors: David K. Parker, Cheltenham (GB); Denton Gentry, Fremont, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1105 days.

(21) Appl. No.: 11/323,998

(22) Filed: Dec. 30, 2005

(51) Int. Cl.
*H04L 12/28* (2006.01)
*H04L 12/56* (2006.01)

(52) U.S. Cl. ............................ 370/392; 370/419
(58) Field of Classification Search ........... 370/230, 370/352, 356, 379, 389, 392, 393, 401
See application file for complete search history.

(56) References Cited

U.S. PATENT DOCUMENTS

| | | | |
|---|---|---|---|
| 5,072,443 A | | 12/1991 | Hahne et al. |
| 5,282,270 A | | 1/1994 | Oppenheimer et al. |
| 5,764,636 A | * | 6/1998 | Edsall .................... 370/401 |
| 5,852,607 A | * | 12/1998 | Chin ..................... 370/401 |
| 5,923,660 A | | 7/1999 | Shemla et al. |
| 5,999,518 A | | 12/1999 | Nattkemper et al. |
| 6,034,957 A | | 3/2000 | Haddock et al. |
| 6,172,980 B1 | | 1/2001 | Flanders et al. |
| 6,173,333 B1 | | 1/2001 | Jolitz et al. |
| 6,198,741 B1 | * | 3/2001 | Yoshizawa et al. ......... 370/392 |
| 6,208,649 B1 | * | 3/2001 | Kloth .................... 370/392 |
| 6,275,861 B1 | | 8/2001 | Chaudri et al. |
| 6,295,299 B1 | | 9/2001 | Haddock et al. |
| 6,351,801 B1 | | 2/2002 | Christie et al. |
| 6,381,242 B1 | | 4/2002 | Maher, III et al. |
| 6,384,750 B1 | | 5/2002 | Brown |
| 6,457,058 B1 | * | 9/2002 | Ullum et al. ............... 709/238 |
| 6,463,067 B1 | | 10/2002 | Hebb et al. |
| 6,515,963 B1 | * | 2/2003 | Bechtolsheim et al. ...... 370/229 |
| 6,553,002 B1 | | 4/2003 | Bremer et al. |
| 6,570,877 B1 | | 5/2003 | Kloth et al. |

(Continued)

FOREIGN PATENT DOCUMENTS

WO WO 03/081857 10/2003

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Jayanti K Patel
*Assistant Examiner*—Christopher T Wyllie
(74) *Attorney, Agent, or Firm*—Blakely, Sokoloff, Taylor & Zafman

(57) ABSTRACT

A method of providing virtual router functionality to a packet responsive to one or more abstracted virtual packet identifiers is provided. The method occurs in a networking device having a router core. The one or more abstracted virtual identifiers are abstracted from one or more virtual identifiers derived from the packet, thus insulating the router core from changes in the one or more virtual identifiers. A packet is received having a VLAN field, and a key is formed from the VLAN field and at least one other packet field. The key is mapped into an abstracted virtual identifier using an indirection mapping process. One or more core virtual router functions are then performed responsive to the abstracted virtual identifier.

25 Claims, 4 Drawing Sheets

U.S. PATENT DOCUMENTS

| | | | |
|---|---|---|---|
| 6,631,465 | B1 | 10/2003 | Chen et al. |
| 6,658,002 | B1 | 12/2003 | Ross et al. |
| 6,738,892 | B1 | 5/2004 | Coon et al. |
| 6,763,023 | B1 | 7/2004 | Gleeson et al. |
| 6,765,881 | B1 | 7/2004 | Rajakarunanayake |
| 6,862,280 | B1 * | 3/2005 | Bertagna ............... 370/392 |
| 6,871,262 | B1 | 3/2005 | Oren et al. |
| 6,882,642 | B1 | 4/2005 | Kejriwal et al. |
| 6,888,797 | B1 | 5/2005 | Cao et al. |
| 6,914,905 | B1 | 7/2005 | Yip |
| 6,917,617 | B2 | 7/2005 | Jin et al. |
| 6,957,258 | B2 | 10/2005 | Maher, III et al. |
| 6,975,581 | B1 | 12/2005 | Medina et al. |
| 6,976,158 | B2 | 12/2005 | Catherwood et al. |
| 6,980,552 | B1 | 12/2005 | Belz et al. |
| 6,999,462 | B1 | 2/2006 | Acharya |
| 7,062,398 | B1 | 6/2006 | Rothberg |
| 7,062,641 | B1 | 6/2006 | Devanagondi et al. |
| 7,079,407 | B1 | 7/2006 | Dimitrelis |
| 7,111,101 | B1 | 9/2006 | Cox |
| 7,139,271 | B1 | 11/2006 | Parruck et al. |
| 7,152,191 | B2 | 12/2006 | Kessler et al. |
| 7,190,696 | B1 | 3/2007 | Manur et al. |
| 7,212,837 | B1 | 5/2007 | Calhoun et al. |
| 7,248,584 | B2 | 7/2007 | Hooper |
| 7,248,585 | B2 | 7/2007 | Kohn et al. |
| 7,274,693 | B1 * | 9/2007 | Kloth et al. ............. 370/389 |
| 7,296,100 | B1 | 11/2007 | Venkatesh et al. |
| 7,304,996 | B1 | 12/2007 | Swenson et al. |
| 7,444,405 | B2 | 10/2008 | Gangadharan |
| 7,487,938 | B2 | 2/2009 | Brady et al. |
| 7,515,589 | B2 | 4/2009 | Bacher et al. |
| 2001/0025315 | A1 | 9/2001 | Jolitz |
| 2002/0191605 | A1 | 12/2002 | Lunteren et al. |
| 2003/0069973 | A1 | 4/2003 | Ganesan et al. |
| 2003/0152075 | A1 * | 8/2003 | Hawthorne et al .......... 370/389 |
| 2003/0154380 | A1 * | 8/2003 | Richmond et al. .......... 713/182 |
| 2003/0193949 | A1 | 10/2003 | Kojima et al. |
| 2003/0214956 | A1 * | 11/2003 | Navada et al. ............. 370/401 |
| 2004/0003110 | A1 | 1/2004 | Ozguner |
| 2004/0015683 | A1 | 1/2004 | Emma et al. |
| 2004/0100956 | A1 | 5/2004 | Watanabe |
| 2004/0205753 | A1 | 10/2004 | Moore |
| 2004/0246981 | A1 * | 12/2004 | He et al. ..................... 370/419 |
| 2004/0258062 | A1 | 12/2004 | Narvaez |
| 2005/0074009 | A1 * | 4/2005 | Kanetake et al. ............ 370/392 |
| 2005/0198362 | A1 | 9/2005 | Navada et al. |
| 2005/0226242 | A1 | 10/2005 | Parker |
| 2006/0007917 | A1 | 1/2006 | Saito et al. |
| 2006/0039374 | A1 | 2/2006 | Belz et al. |
| 2007/0153808 | A1 * | 7/2007 | Parker et al. ........... 370/395.53 |
| 2008/0222094 | A1 | 9/2008 | Cox |

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at http://www.faqs.org/rfcs/rfc1141.html.

Network Working Group, *RFC 1624—Computation of the Internet Checksum via incremental update*, May 1994, available at http://www.faqs.org/rfcs/rfc1624.html.

Netlogic Microsystems, Product Brief NSE5000GLQ, Copyright 2004, available at http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

\* cited by examiner

| | | | | |
|---|---|---|---|---|
| 504 • | TYPE [3 bits] | PORT [6 bits] | | = 9 bits total |
| 506 • | TYPE [3 bits] | VLAN ID [12 bits] | | = 15 bits total |
| 508 • | TYPE [3 bits] | VMAN ID [12 bits] | | = 15 bits total |
| 510 • | TYPE [3 bits] | VLAN ID [12 bits] | PORT [6 bits] | = 21 bits total |
| 512 • | TYPE [3 bits] | VLAN ID [12 bits] | VMAN ID [12 bits] | = 27 bits total |
| 514 • | TYPE [3 bits] | VLAN ID [12 bits] | VMAN ID [12 bits] PORT [6 bits] | = 33 bits total |

METHOD OF PROVIDING VIRTUAL ROUTER FUNCTIONALITY THROUGH ABSTRACTED VIRTUAL IDENTIFIERS

This application is related to U.S. patent application Ser. No. 11/324,159, entitled "METHOD OF PROVIDING VIRTUAL ROUTER FUNCTIONALITY," filed Dec. 30, 2005; U.S. patent application Ser. No. 11/324,209, entitled "MAC ADDRESS DETECTION DEVICE FOR VIRTUAL ROUTERS," filed Dec. 30, 2005; and U.S. patent application Ser. No. 11/324,205, entitled "METHOD OF EXTENDING DEFAULT FIXED NUMBER OF PROCESSING CYCLES IN PIPELINED PACKET PROCESSOR ARCHITECTURE," filed Dec. 30, 2005, each of which is hereby incorporated by reference herein as though set forth in full.

BACKGROUND OF THE INVENTION

1. Field of the Invention

This application relates generally to networking devices, and, more specifically, networking devices that present different virtual router configurations to different end users, classes of service or packets.

2. Related Art

Virtual router functionality refers to the capability of the same physical networking device of presenting different virtual router configurations to different end users, classes of desired service, or packets. As a result of this capability, the same physical device appears as a plurality of different virtual routers.

Current networking devices provide virtual router functionality through certain virtual identifiers, for example, VLAN and virtual port fields, which may be obtained or derived from information in an incoming packet. More specifically, current devices perform core virtual router functions responsive to these virtual identifiers. In fact, the VLAN field, which designates a virtual LAN, a collection of network elements that may be physically disparate but are logically related such that they may be considered part of the same LAN for OSI layer two routing/switching purposes, impacts almost every core virtual router function. Similarly, the virtual port field, which is the combination of the VLAN field and the ingress port field, also impacts other core virtual router functions.

This approach worked fine as long as network usage or standards remain static, and changes in the virtual identifier type and format occurred infrequently. However, in current TCP/IP or UDP/IP networks, where network usage and standards are dynamic and constantly evolving, the approach is problematic as changes in virtual identifier type or format, for example, VLAN type or format, occur frequently. Recently, for example, a 24-bit "super" VLAN field, the ESID field, was recognized as a valid Ethertype, marking an addition to the 12-bit VLAN field that had existed before. Therefore, with the current approach, the device has to be entirely retooled on a relatively frequent basis in order to provide the same virtual router functionality as before.

Another problem with the current approach is that it is not scaleable with an increase in the number of VLANs that may need to be accommodated. In the current approach, for example, an increase in the size of the VLAN field to allow for an increase in the number of VLANs multiplies in direct proportion the number of virtual port state tables, i.e., a tables indicating the state of each virtual port in the router, as well as other resources, that need to be maintained.

SUMMARY

The invention provides a method of providing virtual router functionality to a packet responsive to one or more abstracted virtual identifiers. The method occurs in a networking device having a router core. The one or more abstracted virtual identifiers are abstracted from one or more virtual identifiers derived from the packet, thus insulating the router core from changes in the one or more virtual identifiers.

The method begins when a packet is received having a VLAN field. Upon receipt of the packet, a key is formed from the VLAN field and at least one additional packet field, for example, a VMAN field.

The key is then mapped into an abstracted virtual identifier using an indirection mapping process. According to this indirect mapping process, a table having a plurality of entries, each having a content value and an index value, is accessed to locate an entry having a content value that matches the key. The index value of the matching entry is then mapped into the abstracted virtual identifier using an associated data store element.

One or more core virtual router functions are then performed responsive to the abstracted virtual identifier. For example, in the case where the abstracted virtual identifier is an abstracted VLAN, the core functions might include one or more of the foregoing: qualifying OSI layer two MAC addresses using the AVID, limiting OSI layer two broadcast domains using the AVID, performing OSI layer three redirection using the AVID, performing router MAC address detection using the AVID, or classifying and forwarding the packet responsive to the AVID.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
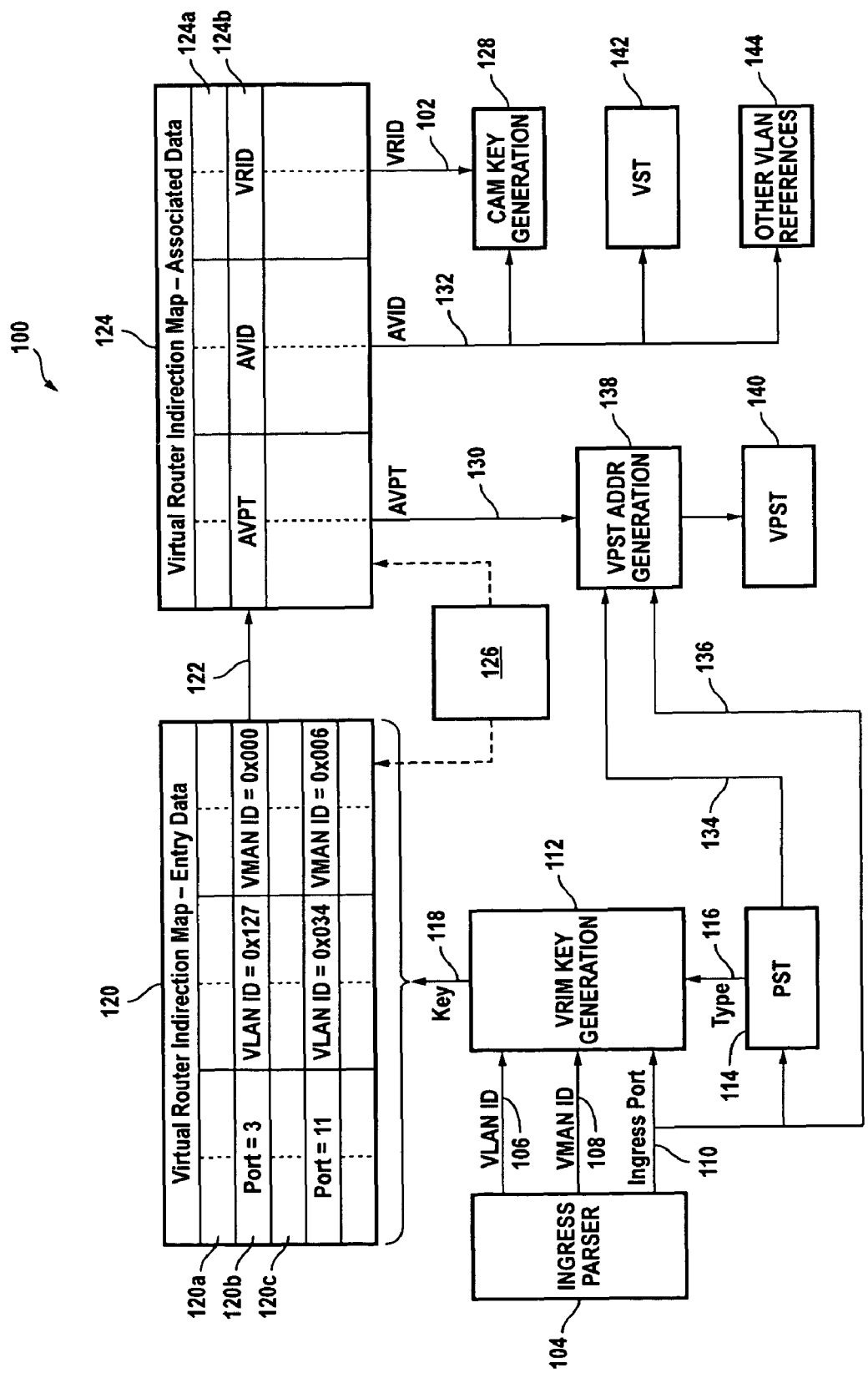
FIG. 1 is a block diagram showing the method steps, data structures and logic elements used in producing an abstracted VLAN (AVID) and abstracted virtual port (AVPT) according to one embodiment, characterized in that an indirect mapping process is used to map a key, generated from one or more packet fields, to the AVID and AVPT.

Referring to FIG. 1, a block diagram depicting the steps of a method 100, performed in a networking device, of providing virtual router functionality to a packet is illustrated. Also shown are the data structures used in the performance of the method, and the logic elements that perform the method steps. In this particular embodiment, the method is performed in the device after the packet has been parsed by packet parser 104, thus making available for use by the method certain packet fields successfully parsed by the parser 104, including VLAN 106, VMAN 108, and ingress port 110. The method may be performed in any networking device that is capable of forwarding or classifying packets at OSI layer three or above, including but not necessarily limited to routers, switches, or combination routers/switches. For purposes of this disclosure, a "virtual router" includes both a "lightweight" virtual router, i.e., one that virtually routes at OSI layer three, and a "heavyweight" virtual router, i.e., one that virtually routes at OSI layer three, but in addition implements distinct OSI layer two functions per virtual router. Additionally, for purposes of this disclosure, the singular terms "device" or "router" include multiple devices or routers, respectively.

As previously explained, the VLAN field 106 designates a virtual LAN, a collection of network elements that may be physically disparate but are logically related such that they may be considered part of the same LAN for OSI layer two routing/switching purposes. Presently, the primary usage of the VLAN terminology is to uniquely identify logically related end user equipment within a VMAN (see below).

The VMAN field 108 designates a virtual metropolitan network, a collection of network elements that may be physically disparate but are logically related such that they may be considered part of the same network. Although the term originally applied only to metropolitan networks, that usage has evolved such that the term is now used to designate any network, metropolitan or non-metropolitan. In fact, as VMAN usage has proliferated, that term is now used primarily by service providers to designate logically related infrastructure equipment. At the same time, as explained above, the VLAN terminology is now primarily used to uniquely identify logically related end user equipment within a VMAN. Significantly, as a VLAN value uniquely identifies a VLAN within a VMAN, the same VLAN value may not be used to refer to different end user equipment within a VMAN.

The ingress port number 110 is an identifier of the physical port on which the packet was received at the device.

Returning to FIG. 1, the object of the method is to determine an abstracted virtual port identifier (AVPT) 130 and abstracted VLAN identifier (AVID) 132 responsive to the incoming packet, wherein the AVPT is an abstraction of the packet's virtual port (combination of VLAN and ingress port) and the AVID is an abstraction of the packet's VLAN.

Figure 2A:
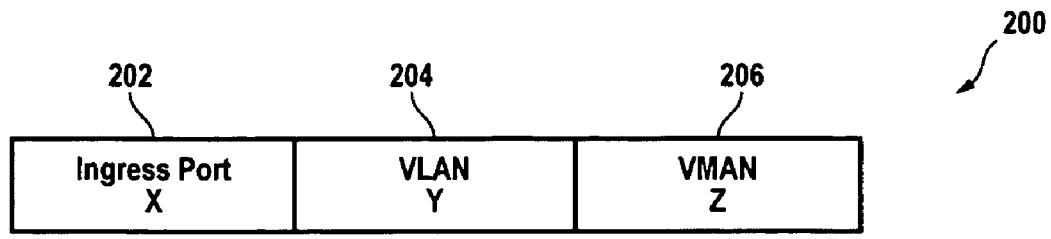
FIG. 2a illustrates an example of a key format.

The method begins when key generation logic 112 forms a key from the VLAN 106, VMAN 108 and ingress port 110 fields. In the particular embodiment illustrated, the key is formed by concatenating these three fields together, although it should be appreciated that other methods of forming the key are possible. Thus, for example, in one embodiment, an incoming packet received over ingress port X, having a VLAN of Y, and a VMAN of Z, has a key 200 formatted as illustrated in FIG. 2a, with three concatenated fields, the first field 202 holding ingress port X, the second field 204 holding VLAN Y, and the third field 206 holding VMAN Z.

Figure 2B:
FIGS. 2b-2e illustrate various examples of key types wildcarding different ones of the fields making up the key format.
Figure 2C:
Figure 2D:
Figure 2E:

Concurrently, in one embodiment, the ingress port 110 is input to a port state table (PST) 114 to determine a key type 116. In this embodiment, the key type functions as a mask, by indicating which of the three fields of the key are to be wildcarded, i.e., ignored in the subsequent processing, and which are to be used. In this particular embodiment, each of the three fields can be independently wild-carded or not. Thus, for example, FIG. 2b illustrates a key type in which the ingress port and VMAN fields are wildcarded (designated by the X appearing in the corresponding fields), and only the VLAN field used in the subsequent processing. Similarly, FIG. 2c illustrates a key type in which the ingress port field is wildcarded, and the VLAN and VMAN fields are used in the subsequent processing. FIG. 2d illustrates a key in which the VLAN field is wildcarded, and the ingress port and VMAN fields are used in the subsequent processing. FIG. 2e illustrates a key in which the VMAN field is wildcarded, and the ingress port and VLAN fields are used in the subsequent processing.

In the embodiment illustrated in FIG. 1, the key type 116 is determined responsive to the ingress port field 110, which forms the input to PST 114. PST 114 has a plurality of entries each having an index value and a content value that specifies a particular key type, for example, such as illustrated in FIGS. 2b-2e. A lookup occurs by mapping the ingress port field 110 into a particular index, looking up the entry having that index, and setting the key type to the content value of that entry. In other embodiments, the key type may be determined responsive to other packet fields and more than one packet field.

Figures 3, 5:
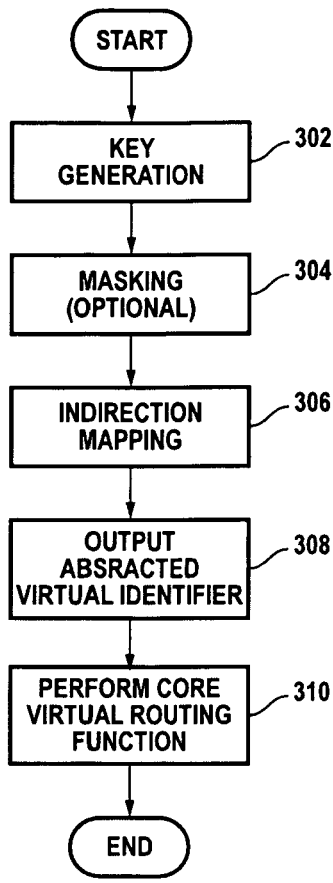
FIG. 3 is a flowchart illustrating the method steps in one embodiment, characterized in that one or more core virtual router functions are performed responsive to the AVID and AVPT.
FIG. 5 illustrates examples of alternative data types that may apply depending on the type of VLAN field detected in the ingress packet.

FIG. 5 illustrates an implementation where the key type is a 3 bit field, identified with numeral 502, that is appended to the key, and indicates both the format of the key and which fields of the key are to be wildcarded. For example, the key type for key 504 indicates both that the key is 9 bits wide, and that the VLAN and VMAN fields are to be wildcarded; the key type for key 506 indicates both that the key is 15 bits wide, and that the ingress port and VMAN fields are to be wildcarded; the key type for key 508 indicates both that the key is 15 bits wide, and that the ingress port and VLAN fields are to be wildcarded; the key type for key 510 indicates both that the key is 21 bits wide, and that the VMAN field is to be wildcarded; the key type for key 512 indicates both that the key is 27 bits wide, and that the ingress port field is to be wildcarded; and the key type for key 514 indicates that the key is 33 bits wide, and that none of the fields are to be wildcarded.

Moreover, as will be discussed in greater detail below, in the case where a ternary CAM is used to perform the indirection mapping process, whereby the key is indirectly mapped into a virtual router identifier, the just discussed key type generation and key masking processes are unnecessary as individual fields in the content values corresponding to the ternary CAM entries can be wildcarded, i.e., set as don't care values. In the case where a binary CAM is used to perform the indirection mapping process, the just discussed key type generation and key masking processes should generally be retained.

Referring again to FIG. 1, the key 118, masked or unmasked as the case may be, is then mapped into a virtual router identifier (VRID) 102 using a two-step indirection mapping process performed by logic 126. In the first step, as illustrated, a table 120 is accessed, the table having a plurality of entries 120a, 120b, 120c, each having a content value and an index value, and locating an entry having a content value that matches the key. In FIG. 1, the content value of entry 120b is shown as matching the key 118. The index value of the matching entry, identified with numeral 122, forms an input to the second step of the process.

In the second step, the index value 122 of the matching entry 120b is mapped into the VRID 102, the AVPT 130 and the AVID 132 using an associated data store element 124. The associated data store element 124 has a plurality of entries 124a, 124b, each having an index value and a content value. In one embodiment, the mapping is performed by selecting the entry in the associated data store element 124 whose index value matches the index value 122 for the matching entry in the table 120. In the particular example illustrated in FIG. 1, entry 124b satisfies this condition. The content value of this entry is or contains the VRID 102, the AVPT 130 and the AVID 132.

In one implementation, the table 120 is stored on a CAM, and the first step of the two-step process occurs by having the CAM search for and locate the entry 120b whose content value matches the key 118. In the case where the CAM is a binary CAM, i.e., a CAM where each bit in the content value of an entry can only take on the binary values "0" and "1," the previously described key type generation and masking processes should generally be performed as these functions are not available through the CAM. However, in the case where the CAM is a ternary CAM, i.e., a CAM where each bit in the content value of an entry can take on the binary values "0" and "1," but also a "don't care" value, the previously described key type generation and masking processes are optional as these functions may be performed through suitable settings of the content values of the CAM entries.

In a second implementation, the table 120 is stored in RAM, and the first step of the two-step process occurs by applying a hash function to the key 118 to determine a table index for a starting entry, and then searching the table 120, beginning with the starting entry, to locate the entry 120b whose content value matches the key 118.

The AVPT 130 and AVID 132 are then each used to support one or more core router functions. Considering first the AVPT 130, that identifier is used to perform a spanning tree lookup operation for the virtual port. As is known, according to the spanning tree protocol, a software agent continuously detects for loops at the OSI layer two level. Upon detecting such a loop, the agent disables selected ports in the loop so prevent endless cycling of packets through the loop at the OSI layer two level. The spanning tree state of a port is the state whereby the port is either "on" or "off," i.e., disabled, as determined by the software agent. The state can change over time. If for example, a port in a loop becomes disabled for a reason independent of spanning tree loop detection, it may be necessary to enable a port in the loop that was previously disabled as result of spanning tree loop detection. Thus, this state can dynamically change over time. Moreover, depending on the protocol, the state can be maintained for each physical port, or each virtual port.

In one embodiment of the subject invention, the state is maintained for each abstracted virtual port in virtual port state table (VPST) 140. To access the VPST 140 to determine the spanning tree state for the abstracted virtual port identified by the AVPT 130, logic 138 generates an address in the VPST 140 for the particular entry in the VPST 140 that holds the state for that abstracted virtual port.

Logic 112 forms the address from the combination of the physical ingress port 110 and AVPT 130, allowing a separate state to be maintained for each VLAN to which the physical port is assigned. In this particular embodiment, the combination of the AVID 132 and the ingress port 110 was not used, as the latter might result in a VPST 114 that is wasteful of memory. In particular, an address formed from the combination of the AVID 132 and the ingress port 110 was not used in this embodiment because it assumes each port is assigned to the same number of VLANs, an assumption that might not always hold true.

For example, in the case of a port that is an uplink, it may be desirable to assign the port to a greater number of VLANs than to other ports. If the addressing required the same number of VLANs to be assigned to each physical port as to an uplink, vast portions of the VPST 138 would be wasted. Therefore, in the embodiment illustrated in FIG. 1, logic forms the address from the combination of the AVPT 130 and the physical ingress port 110 rather than the combination of the AVID 132 and the ingress port 110.

Another input to logic 138 is an indication, on signal line 134, of whether the ingress port 110 is an uplink or not. In the embodiment illustrated in FIG. 1, that indication is provided from the entry in PST 114 that corresponds to the ingress port 110. This indication allows a greater number of entries in the VPST 140 to be allocated to a port that is an uplink than to other physical ports.

Once the address is determined, an access in made to VPST 140 to determine the spanning tree state of the abstracted virtual port identified by the AVPT 130. If the state is "on," the packet is allowed to be forwarded to its destination. If the state is "off," the packet is either killed or else sent to a CPU host or some other default destination for diagnostic purposes.

Turning back to FIG. 1, the AVID 132 may be used to support several core virtual router functions. First, the AVID 132 may be input to CAM key generation logic 128, and thereby influence the selection or generation of a key by logic 128 to a CAM that determines the address of a sequence of commands to be executed by a packet processor (not shown) in making a classification and forwarding decision for an ingress packet. The AVID 132 may influence the selection or generation of the key on a one-time basis or on an ongoing basis, i.e., for each cycle of processing by the packet processor. (As shown, the VRID 102 may also influence this process.). For purposes of this disclosure, the term "processor" refers to any device capable of executing one or more commands, instructions or state transitions, and includes, without limitation, a general- or special-purpose microprocessor, finite state machine, controller, computer, digital signal processor (DSP), or the like.

Second, the AVID 132 may be input to VLAN State Table (VST) 142, and thereby determine the quality of service (QoS) measure typically by that table and assigned to the packet.

Third, the AVID 132 may be used in support of other core virtual router functions performed by logic 144, for example, qualifying OSI layer two MAC addresses; limiting OSI layer two broadcasting or flooding domains; performing OSI layer three indirection; and performing router MAC address detection.

The foregoing embodiment overcomes the problems identified at the outset with the conventional approach for providing virtual router functionality.

First, the embodiment is flexible, easily accommodates changes in network usage or standards, and insulates the router core from these changes. Consider, for example, the recent addition of a super-wide (24 bit) VLAN field, i.e., the ESID field, to the list of permissible Ethertypes.

Second, the embodiment is scaleable as an increase in the number of possible VLANs would not necessarily require a commensurate increase in size of the VPST 140, or other resources, that are maintained. Instead, many different key values could be mapped into the same AVID through appropriate settings of the index values associated with the entries 120a, 120b, 120c in the table 120. For example, in FIG. 1, if it were desired that the index values for entries 120b and 120c map into the same AVID, the index values for the entries 120b and 120c would be set to the same value.

Third, the embodiment better handles sparse mappings as large number of possible VLANs would not necessarily require a commensurate size of the VPST 140, or other resources, that are maintained. Instead, as discussed, many different key values could be mapped into the same AVID through appropriate settings of the index values associated with the entries 120a, 120b, 120c in the table 120.

FIG. 3 summarizes the steps that are performed in one embodiment of the overall method. Step 302 comprises the key generation step performed by the logic 112 in FIG. 1. Step 304 comprises the optional key type generation and masking processes performed by the logic 112 in FIG. 1, with the key type determined through an access to lookup table 112. For purposes of this disclosure, the term "logic" refers to implementations in hardware, software, or combinations of hardware and software.

Step 306 comprises the two-step indirection mapping process, wherein the first step involves searching or having performed a search through table 120, which may or may not be stored on a CAM, to find the entry 120b whose content value matches the key 118, and the second step involves locating the entry 124b in the associated data store 124, typically a RAM, whose index value matches the index value 122 of the matching entry in the table 120.

Step 308 comprises outputting the AVPT 130 and AVID 132. In FIG. 1, this step involves outputting the content value, or a designated field in the content value, of the entry 124b whose index value matches the index value 122 of the matching entry in the table 120.

Steps 306 and 308 are performed by logic 126 (illustrated in FIG. 1) through suitable accesses to table 120 and associated data element 124, as indicated by the dotted arrows between these elements.

Step 310 comprises performing one or more core router functions responsive to the AVPT 130 and/or AVID 132. As discussed, this step is perform by one or more of the logic 128, 138, 140, 142, and 144 illustrated in FIG. 1.

Figure 4:
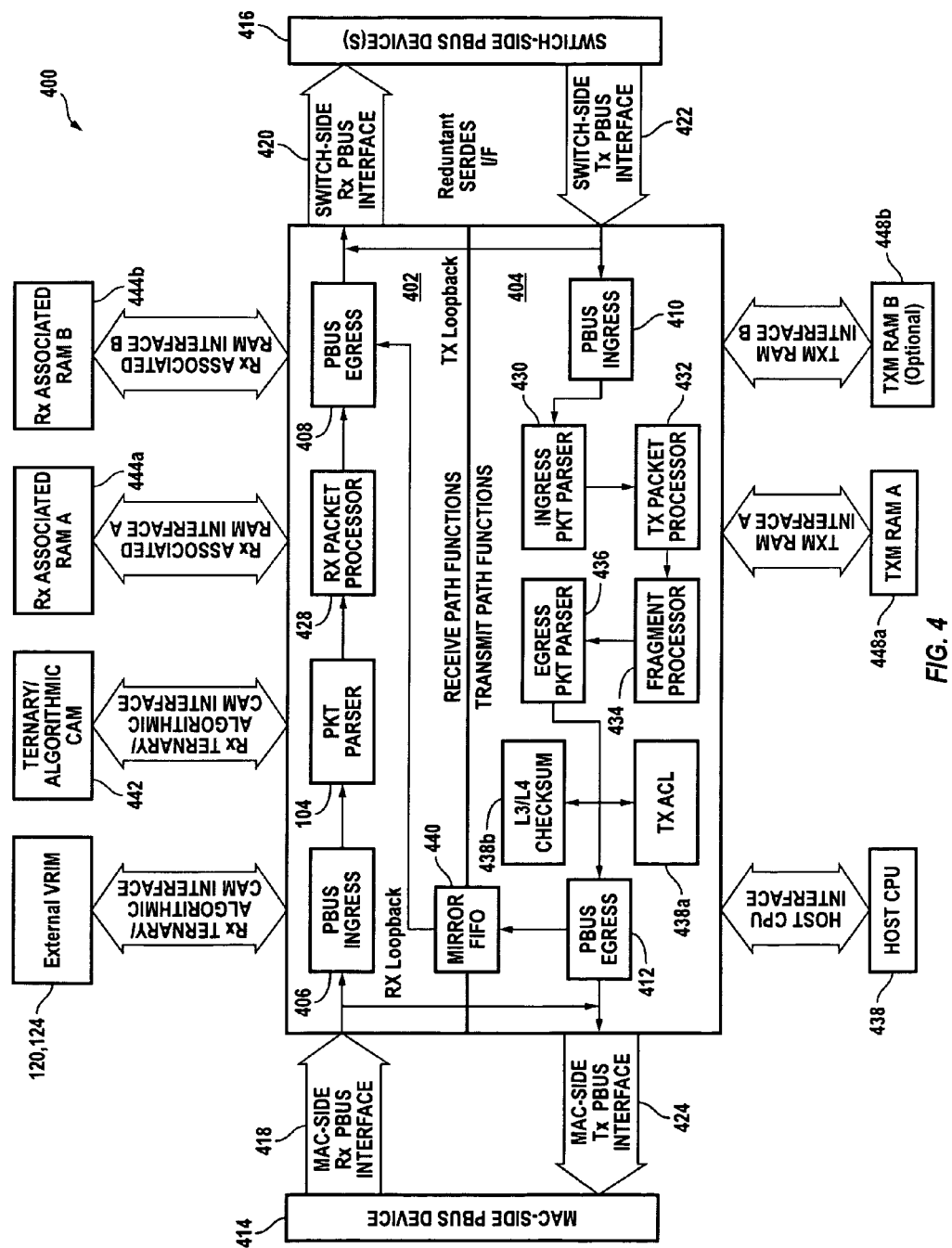
FIG. 4 illustrates a particular router architecture that embodies or utilizes the claimed method and system.

FIG. 4 illustrates an embodiment 400 of a particular router architecture in which the aforementioned method may operate. In this embodiment, as shown, the router is structured as a packet processing system comprising a packet classification/forwarding system 402 and a packet modification system 404. The packet classification/forwarding system 402 has an ingress portion 406 and an egress portion 408 through which ingress (network-side) packets may respectively enter and exit the packet classification/forwarding system 402. Similarly, the packet modification system 404 has an ingress portion 410 and an egress portion 412 through which egress (switch-side) packets may respectively enter and exit the packet modification system 404.

The ingress portion 406 of the packet classification/forwarding system 402 is coupled, through interface 418, to one or more network-side devices 414, and the egress portion 408 of the packet classification/forwarding system 402 is coupled, through interface 420, to one or more switch-side devices 416. Similarly, the ingress portion 410 of the packet modification system 404 is coupled, through interface 422, to the one or more switch-side devices 416, and the egress portion 412 of the packet modification system 404 is coupled, through interface 423, to the one or more network-side devices 414.

In addition to the ingress and egress portions 406, 408, the packet classification system 402 further comprises a first packet parser 104 (the same packet parser 104 illustrated in FIG. 1), and a packet processor 428.

Parser 104 is configured to parse an ingress packet and provide context pointers to the beginning of the packet layers, for example, pointers to the beginning of OSI layers 2, 3, and 4.

Packet processor 428 is configured to classify and forward the packet, responsive to the context pointer provided by parser 104.

Content Addressable Memory (CAM) 442 is used by the packet classification/forwarding system 402 to perform packet searches to arrive at a classification/forwarding decision for a packet. The CAM 442 may be ternary, binary, or combinations of binary and ternary.

The associated RAMS (ARAMs) 444a, 44b provide associated data for each entry in the CAM 442. The ARAMs 444a, 444b are accessed using the address (index value) returned by the CAM 442 as a result of a search operation. The ARAM 444a, 444b entry data is used to supply intermediate classification/forwarding information for the packet that is used by the packet processor 428 in making a final classification/forwarding decision for the packet.

The table 120, which may or may not be stored on a CAM, and the associated data store 124, which collectively may be referred to as a Virtual Router Indirection Mapper (VRIM), are the same elements previously discussed in relation to FIG. 1.

In addition to the ingress and egress portions 410, 412, the packet modification system 404 further comprises a second packet parser 430 for parsing an egress packet, modification processor 432, a fragment processor 436, a third packet parser 436, Access Control Logic ("ACL") 438a, and L3/L4 checksum logic 438b.

Parser 430 is configured to parse an egress packet and provide context pointers to the beginning of the packet layers, for example, pointers to the beginning of OSI layers 2, 3, and 4.

Modification processor 432 modifies some or all of an egress packet responsive to the context pointers provided by parser 430, in the process disassembling the packet into fragments. Fragment processor 436 re-assembles the fragmented packet.

The modification RAMs ("MRAMs") 448a, 448b provides data and control structures for packet modification operations performed by the modification processors 432a, 432b.

Parser 436 is configured to parse the reassembled packet and provide context pointers to the beginning of the packet layers, for example, pointers to the beginning of OSI layers 2, 3, and 4.

ACL logic 438b arrives at an ACL decision with respect to a packet, such as CPU copy, mirror copy; and kill, responsive to the parsed packet layers provided by parser 436. The CPU copy action forwards a copy of the packet to a host 438 coupled to the system. The mirror copy action implements an egress mirroring function, in which a copy of the packet is forwarded to mirror FIFO 440 and then on to the egress portion 408 of the packet classification/forwarding system 402. The kill action either kills the packet or marks it for killing by a downstream Medium Access Control (MAC) processor.

L3/L4 checksum logic 438b is configured to compute a checksum for a modified packet. In one embodiment, logic 438b is configured to independently calculate a layer three (IP) and layer four (TCP/UDP) checksum.

In one implementation, the interfaces 418, 420, 422, 424, and one or more of the CAM, VRIM, ARAM, or MRAM interfaces (not identified, may be a QDR- or DDR-type interface as described in U.S. patent application Ser. No. 10/655,742, filed Sep. 4, 2003, which is hereby fully incorporated by reference herein as though set forth in full.

In one embodiment, the logic elements of FIG. 1 are incorporated into the architecture of FIG. 4 within the forwarding and classification system 402, just downstream from the packet parser 104 and parallel with the packet processor 428, and operate in relation to an ingress packet. In this embodiment, logic 112 in FIG. 1 performs the key generation step 302 of FIG. 3 responsive to parsed packet data provided by parser 104. Logic 104 also performs the optional key type generation and masking step 304 if a ternary CAM is not included in the VRIM 120, 124 and used as part of the indirection mapping process 306. If a ternary CAM is included in the VRIM 120, 124, and used as part of the indirection mapping process 306, the key type generation and masking step 304 may be performed by this CAM. Logic 126 further performs the indirection mapping process 306 in conjunction with the elements of VRIM 120, 124, as well as the AVPT 130 and AVID 132 outputting step 308. Logic 128, 138, 140, 142, 144 performs the perform core virtual router function step 310 of FIG. 3 responsive to either or both the AVPT 130 and AVID 132.

In a second embodiment, the logic elements of FIG. 1 are incorporated into the architecture of FIG. 4 within the modification system 404, just downstream from the packet parser 436, and operate in relation to an egress packet. In this embodiment, logic 112 in FIG. 1 performs the key generation step 302 of FIG. 3 responsive to parsed packet data provided by parser 436. Logic 104 also performs the optional key type generation and masking step 304 if a ternary CAM is not included in the VRIM 120, 124 and used as part of the indirection mapping process 306. If a ternary CAM is included in the VRIM 120, 124, and used as part of the indirection mapping process 306, the key type generation and masking step 304 may be performed by this CAM. Logic 126 further performs the indirection mapping process 306 in conjunction with the elements of VRIM 120, 124, as well as the AVPT 130 and AVID 132 outputting step 308. ACL logic 438a performs the perform core virtual router function step 310 of FIG. 3 responsive to either or both the AVPT 130 and AVID 132.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method, performed in, by or for a networking device having a router core, of performing one or more core virtual router functions for a packet responsive to one or more abstracted virtual identifiers abstracted from one or more virtual identifiers derived from the packet, thus insulating the router core from changes in the one or more virtual identifiers, the method comprising the steps of:

receiving a packet having VLAN, VMAN, and ingress port fields;

forming a key from the VLAN, VMAN and ingress port fields;

masking the key with a key type determined responsive to the ingress port field;

mapping the masked key into an abstracted VLAN identifier (AVID) and abstracted virtual port identifier (AVPT) using a two-step indirection mapping process, comprising a first step and a second step, wherein the first step comprises accessing a table having a plurality of entries, each having a content value and an index value, and locating an entry having a content value that matches the masked key, and the second step comprises mapping the index value of the matching entry into the AVID and AVPT by using the index value to identify an entry in an associated data store element containing or including the AVID and AVPT;

performing one or more core virtual router functions responsive to the AVID, the one or more core virtual router functions selected from the group consisting of: qualifying OSI layer two MAC addresses;

limiting OSI layer two broadcasting or flooding domains;

performing OSI layer three indirection;

performing router MAC address detection; and generating a CAM key in support of a packet processor operation; and looking up a spanning tree state responsive to the AVPT.

2. A system, in or associated with a networking device, for determining, using a two-step indirection mapping process comprising a first step and a second step, an abstracted VLAN identifier (AVID) and an abstracted virtual port identifier (AVPT), for use in performing one or more core virtual router functions for a packet having a VLAN field, comprising:

first logic for forming a key from the VLAN field and at least one additional packet field;

first means for performing the first step of the two-step indirection mapping process by accessing a table having a plurality of entries, each having a content value and an index value, and locating an entry having a content value that matches the key; and second means for performing the second step of the two-step indirection mapping process by mapping the index value of the matching entry into the AVID and the AVPT by using the index value to identify an entry in an associated data store element containing or including the AVID and AVPT; and performing one or more core virtual router functions responsive to the AVID.

3. The system of claim 2 further comprising second logic for masking the key using a key type determined response to one or more packet fields.

4. A method in a router core of a networking device comprising:

receiving a packet having a VLAN field and at least one additional packet field;

forming a key from the VLAN field and the at least one additional packet field;

mapping the key into an abstracted VLAN identifier (AVID) and abstracted virtual port identifier (AVPT) using a two-step indirection mapping process having a first operation and a second operation:

wherein the first operation comprises accessing a table having a plurality of entries, each entry having a content value and an index value, and locating an entry having a content value that matches the key, and wherein the second operation comprises mapping a corresponding index value of the located entry having the content value that matches the key into the AVID and AVPT by using the index value to identify an entry in an associated data store element containing or including the AVID and AVPT; and performing one or more core virtual router functions responsive to the AVID.

5. The method of claim 4 wherein the one or more core virtual router functions comprises at least, determining a quality of service (QoS) for the packet responsive to the AVID.

6. The method of claim 4 the step of performing or more core virtual router functions responsive to the abstracted virtual identifier comprises performing one or more core virtual router functions, responsive to the AVID, selected from the group consisting of:
qualifying OSI layer two MAC addresses;
limiting OSI layer two broadcasting or flooding domains;
performing OSI layer three indirection;
performing router MAC address detection; and
generating a CAM key in support of a packet processor operation.

7. The method of claim 4 wherein the VLAN field is a super VLAN field having a 24-bit wide VLAN field.

8. The method of claim 4 wherein the key is a masked key.

9. The method of claim 8 wherein the key is masked using a key type determined responsive to the packet.

10. The method of claim 9 wherein the key is masked by wildcarding one or more fields of the key based upon the key type.

11. The method of claim 8 wherein the key is masked by wildcarding one or more fields, of entries of a ternary Context Addressable Memory (CAM), the one or more fields determined responsive to the packet.

12. The method of claim 4 wherein the table is stored on a, Context Addressable Memory (CAM), wherein the first operation of the two-step indirection mapping process comprises having the CAM search for and locate the entry whose content value matches the key, and wherein the second operation of the two-step indirection mapping process comprises using the index value of the matched entry to identify the entry in the associated data store element, which comprises an associated RAM, containing or including the AVID.

13. The method of claim 12 wherein the CAM is a binary CAM.

14. The method of claim 12 wherein the CAM is a ternary CAM, wherein each bit within a content value of the CAM comprises either a binary value of "0" or "1," or a "don't care" value.

15. The method of claim 4 wherein the table is stored in a RAM, wherein the first operation of the two-step indirection mapping process comprises applying a hash function to the key to determine a table index for a starting entry, and searching the table beginning with the starting entry to locate the entry whose content value matches the key, beginning with the starting entry, and wherein the second operation of the two-step indirection mapping process comprises using the index value of the matched entry to identify the entry in the associated data store element containing or including the AVID.

16. The method of claim 4 wherein the at least one additional packet field comprises a Virtual Metropolitan Network (VMAN) field.

17. The method of claim 4 wherein the at least one additional packet field comprises a Virtual Metropolitan Network (VMAN) field and an ingress port field.

18. The method of claim 4 wherein the at least one additional packet field comprises an ingress port field.

19. The method of claim 4 wherein the key is unmasked.

20. The method of claim 4 wherein the one or more core router functions comprise performing a spanning tree state lookup operation for an abstracted virtual port responsive to the AVPT.

21. The method of claim 4 wherein the packet is an ingress packet.

22. The method of claim 4 wherein the packet is an egress packet.

23. A networking device comprising: a processor coupled with a router core of the networking device; wherein the processor executes a set of instructions embedded on a memory causing the router core to perform a method comprising:
receiving a packet having a VLAN field and at least one additional packet field;
forming a key from the VLAN field and the at least one additional packet field;
mapping the key into an abstracted VLAN identifier (AVID) and abstracted virtual port identifier (AVPT) using a two-step indirection mapping process having a first operation and a second operation:
wherein the first operation comprises accessing a table having a plurality of entries, each entry having a content value and an index value, and
locating an entry having a content value that matches the key, and
wherein the second operation comprises mapping a corresponding index value of the located entry having the content value that matches the key into the AVID and AVPT by using the index value to identify an entry in an associated data store element containing or including the AVID and AVPT; and
performing one or more core virtual router functions responsive to the AVID.

24. The networking device of claim 23 wherein the at least one additional packet field comprises a Virtual Metropolitan Network (VMAN) field, and wherein the key is formed from the VLAN field, the VMAN field, and an ingress port number associated with the packet received.

25. The method of claim 23 wherein the one or more core virtual router functions performed responsive to the AVID are selected from the group consisting of:
qualifying OSI layer two MAC addresses;
limiting OSI layer two broadcasting or flooding domains;
performing OSI layer three indirection;
performing router MAC address detection; and
generating a CAM key in support of a packet processor operation.

* * * * *